United States Patent
Jiang et al.

(10) Patent No.: US 12,195,360 B2
(45) Date of Patent: Jan. 14, 2025

(54) HIGH-EFFICIENCY SOLAR MULTI-LAYER EVAPORATIVE SEAWATER DESALINATION DEVICE

(71) Applicant: China Institute of Water Resources and Hydropower Research, Beijing (CN)

(72) Inventors: Shan Jiang, Beijing (CN); Yongnan Zhu, Beijing (CN); Jiaqi Li, Beijing (CN); Jianhua Wang, Beijing (CN); Yong Zhao, Beijing (CN); Guohua He, Beijing (CN); Qingming Wang, Beijing (CN); Lizhen Wang, Beijing (CN); Jiaqi Zhai, Beijing (CN); Haihong Li, Beijing (CN); Fan He, Beijing (CN); Changhai Qin, Beijing (CN); Yong Wang, Beijing (CN)

(73) Assignee: China Institute of Water Resources and Hydropower Research, Beijing (CN)

( * ) Notice: Subject to any disclaimer, the term of this patent is extended or adjusted under 35 U.S.C. 154(b) by 0 days.

(21) Appl. No.: 17/770,056

(22) PCT Filed: Feb. 23, 2022

(86) PCT No.: PCT/CN2022/077515
§ 371 (c)(1),
(2) Date: Apr. 19, 2022

(87) PCT Pub. No.: WO2023/108892
PCT Pub. Date: Jun. 22, 2023

(65) Prior Publication Data
US 2024/0300829 A1    Sep. 12, 2024

(30) Foreign Application Priority Data
Dec. 17, 2021    (CN) .......................... 202111552558.7

(51) Int. Cl.
*C02F 1/14*    (2023.01)
*B01D 1/00*    (2006.01)
(Continued)

(52) U.S. Cl.
CPC .............. *C02F 1/14* (2013.01); *B01D 1/0035* (2013.01); *B01D 1/22* (2013.01); *C02F 2103/08* (2013.01); *C02F 2201/002* (2013.01)

(58) Field of Classification Search
CPC ...... C02F 1/14; C02F 2103/08; B01D 1/0035; B01D 1/22
See application file for complete search history.

(56) References Cited

U.S. PATENT DOCUMENTS

| | | | |
|---|---|---|---|
| 3,305,454 A * | 2/1967 | Cowley | B01D 3/10 |
| | | | 202/205 |
| 3,398,060 A * | 8/1968 | Cowley | C02F 1/08 |
| | | | 202/205 |

(Continued)

FOREIGN PATENT DOCUMENTS

| CN | 1868902 A | 11/2006 |
|---|---|---|
| CN | 201140990 Y | 10/2008 |

(Continued)

OTHER PUBLICATIONS

Espacenet Machine Translation of CN1868902A obtained Jul. 24, 2024. (Year: 2024).*

*Primary Examiner* — Jonathan Miller
(74) *Attorney, Agent, or Firm* — Bayramoglu Law Offices LLC (57) ABSTRACT

A high-efficiency solar multi-layer evaporative seawater desalination device includes a transparent housing. In the device, wedge-shaped recesses are formed on an outer wall of the transparent housing; during seawater desalination, seawater is injected into evaporation trays and sunlight is irradiated on the evaporation trays through the transparent housing; the transparent housing is made of a transparent plastic material, such that sunlight can directly enter the transparent housing and increase a temperature therein to speed up the evaporation; the wedge-shaped recesses are on a shady surface; during desalination, seawater in the evaporation trays absorbs heat and evaporates to form water vapor, such that there is a given temperature difference between the water vapor and the outside; and a lower part of the wedge-shaped recess can serve as a condensation surface, (Continued)

the water vapor condenses on the transparent housing or at the wedge-shaped recess.

10 Claims, 5 Drawing Sheets

(51) Int. Cl.
  *B01D 1/22* (2006.01)
  *C02F 103/08* (2006.01)

(56) References Cited

U.S. PATENT DOCUMENTS

| | | | | |
|---|---|---|---|---|
| 5,094,721 | A | * | 3/1992 | Petrek ................ B01D 1/26 203/25 |
| 5,628,879 | A | * | 5/1997 | Woodruff ............ C02F 1/14 203/DIG. 1 |
| 5,795,446 | A | * | 8/1998 | Kirschmann .......... B01D 1/065 159/13.1 |
| 8,083,902 | B2 | * | 12/2011 | Al-Garni ............... B01D 5/006 165/146 |
| 9,289,696 | B2 | * | 3/2016 | Al-Garni ............... F24T 10/10 |
| 9,643,102 | B2 | * | 5/2017 | Al-Sulaiman ........... B01D 1/26 |
| 10,239,767 | B2 | * | 3/2019 | Kerschgens ........... B01D 5/006 |
| 11,724,210 | B2 | * | 8/2023 | Smith ................. B01D 1/0058 203/3 |
| 2017/0283277 | A1 | * | 10/2017 | Kerschgens ............. C02F 1/18 |
| 2022/0072445 | A1 | * | 3/2022 | Smith .................. C02F 1/008 |

FOREIGN PATENT DOCUMENTS

| | | |
|---|---|---|
| CN | 201186886 Y | 1/2009 |
| CN | 111547802 A | 8/2020 |
| FR | 2135338 A1 | 12/1972 |
| WO | 9825679 A1 | 6/1998 |

* cited by examiner

HIGH-EFFICIENCY SOLAR MULTI-LAYER EVAPORATIVE SEAWATER DESALINATION DEVICE

CROSS REFERENCE TO THE RELATED APPLICATIONS

This application is the national phase entry of International Application No. PCT/CN2022/077515, filed on Feb. 23, 2022, which is based upon and claims priority to Chinese Patent Application No. 202111552558.7, filed on Dec. 17, 2021, the entire contents of which are incorporated herein by reference.

TECHNICAL FIELD

The present invention relates to the technical field of seawater desalination and, in particular, to a high-efficiency solar multi-layer evaporative seawater desalination device.

BACKGROUND

Seawater desalination refers to freshwater production through seawater desalination; moreover, it is a freshwater source expansion and augmentation technology to realize the utilization of water resources and increase a total amount of freshwater. It is not affected by time, space, and climate, resulting in water with high-quality and gradually-reasonable price and ensuring stable water supply such as drinking water for coastal residents and industrial boiler-filled water. A process of preparing freshwater from seawater is called seawater desalination. Seawater desalination is mainly used to provide drinking water and agricultural water and, sometimes, edible salt is also produced as a by-product. Seawater desalination is singularly popular in the Middle East and is also used on some islands and ships. More than a hundred scientific research institutions in more than ten countries worldwide are conducting research on seawater desalination and hundreds of seawater desalination facilities with different structures and capacities are at work. A modern large-scale seawater desalination plant can produce thousands, tens of thousands, or even nearly one million tons of freshwater every day. A cost of desalinated water is constantly falling and, in some countries, the cost of desalinated water has been reduced to be the almost same as a cost of tap water. An amount of desalinated water in some areas has reached the scale of water supply in the corresponding country and city. A traditional seawater desalination method is to directly sun-cure and evaporate seawater with solar energy. However, generally, when seawater is directly sun-cured, an evaporation rate of the seawater is low, which will lead to low seawater desalination efficiency.

Therefore, as a remedy, a high-efficiency solar multi-layer evaporative seawater desalination device is provided in the present invention.

SUMMARY

In order to solve the technical problems existing in the prior art, the present invention provides a high-efficiency solar multi-layer evaporative seawater desalination device.

In order to achieve the above objective, the present invention adopts the following technical solutions: A high-efficiency solar multi-layer evaporative seawater desalination device is provided, including a transparent housing, where a freshwater collection box is provided at a bottom of the transparent housing; wedge-shaped recesses are formed on an outer wall of the transparent housing, and the wedge-shaped recesses are wedge-shaped grooves; an evaporation tray is fixedly arranged on a top of an inner wall of the wedge-shaped recess, and a seawater inlet is formed on an outer wall of the evaporation tray located at an uppermost side; and a seawater inlet pipe is inserted into the seawater inlet.

Preferably, a quantity of the wedge-shaped recesses may be determined according to a height of a right wall surface of the transparent housing and the wedge-shaped recesses may be equally spaced on the right wall surface of the transparent housing.

Preferably, the bottom of the transparent housing may be in contact with a bottom of an inner wall of the freshwater collection box and the transparent housing may be horizontally placed inside the freshwater collection box.

Preferably, a water outlet may be formed on an outer wall of the freshwater collection box, a freshwater outlet pipe may be inserted into the water outlet, and an outer wall of the freshwater outlet pipe may be provided with a first control valve.

Preferably, the transparent housing may have a cross section in a right-angled trapezoid, and the transparent housing may be made of a transparent plastic material, a left wall surface of the transparent housing may be a light-facing surface, and the right wall surface of the transparent housing may be a shady surface.

Preferably, a bottom of the evaporation tray may be provided with a thermal insulation layer and the thermal insulation layer may be made of a black heat-insulating heat-gathering foam material.

Preferably, an outer wall of the seawater inlet pipe may be provided with a second control valve.

Preferably, a connecting port may be formed on the outer wall of the evaporation tray, a perforation may be formed at a position on the inner wall of the wedge-shaped recess that corresponds to the connecting port, and a seawater artesian pipe may be arranged between every two adjacent evaporation trays.

Preferably, the seawater artesian pipe may be a U-shaped hollow pipe; the seawater artesian pipe may be inserted into a corresponding connecting port; and the seawater artesian pipe may penetrate an inside of a corresponding perforation on the wedge-shaped recess and may be inserted in the perforation.

Preferably, an overflow port may be formed on an outer wall of an evaporation tray located at a lowermost side, a seawater overflow pipe may be inserted into the overflow port, and an outer wall of the seawater overflow pipe may be provided with a third control valve.

Beneficial Effects

The present invention provides a high-efficiency solar multi-layer evaporative seawater desalination device. The device has the following beneficial effects:

(1) In the high-efficiency solar multi-layer evaporative seawater desalination device, wedge-shaped recesses are formed on an outer wall of the transparent housing; during seawater desalination, seawater is injected into evaporation trays through a seawater inlet pipe, the evaporation trays are fixedly connected to the transparent housing and sunlight is irradiated on the evaporation trays through the transparent housing; the transparent housing is made of a transparent plastic material, such that sunlight can directly enter the transparent housing and increase a temperature therein to speed up the evaporation; the wedge-shaped recesses on the outer wall of the transparent housing are on a shady surface; during desalination, seawater in the evaporation trays absorbs heat and evaporates to form water vapor such that there is a given temperature difference between the water vapor and the outside; and a lower part of the wedge-shaped recess can serve as a condensation surface, the water vapor condenses on the transparent housing or at the wedge-shaped recess, and the condensed water droplets flow along the outer wall of the transparent housing to a freshwater collection box at a bottom for collection, which increases a condensation area and an area in contact with air, reduces a surface temperature, and improves the condensation efficiency.

(2) In the high-efficiency solar multi-layer evaporative seawater desalination device, wedge-shaped recesses are formed on an outer wall of the transparent housing; during seawater desalination, seawater is injected through the seawater inlet pipe from the uppermost evaporation tray and sunlight can directly enter the transparent housing to evaporate the seawater in the evaporation tray; the wedge-shaped recesses on the outer wall of the transparent housing are on a shady surface; during desalination, seawater in the evaporation tray absorbs heat and evaporates to form water vapor such that there is a given temperature difference between the water vapor and the outside; the water vapor formed after the seawater absorbs heat and evaporates condenses on the transparent housing or at the wedge-shaped recess, the condensed water droplets flow along the outer wall of the transparent housing to a freshwater collection box at a bottom for collection; and a bottom of an inner wall of the wedge-shaped recess is inclined downward to speed up the flow of the water droplets.

(3) In the high-efficiency solar multi-layer evaporative seawater desalination device, multiple layers of evaporation trays are arranged inside the transparent housing; during seawater desalination, seawater is injected through a seawater inlet pipe from the uppermost evaporation tray; the evaporation trays are fixedly connected to the transparent housing and sunlight is irradiated on the evaporation trays through the transparent housing; during desalination, the seawater in the evaporation trays absorbs heat and evaporates to form water vapor; the arrangement of the multiple layers of evaporation trays increases an evaporation area; a bottom of the evaporation tray is an upper part of the wedge-shaped recess, and a thermal insulation layer is arranged at the bottom of the evaporation tray; when the seawater in the evaporation tray is to be subjected to evaporation, sunlight is irradiated on the evaporation tray through the transparent housing; and during desalination, the seawater in the evaporation tray absorbs heat and evaporates to form water vapor, and the thermal insulation layer can exert a thermal insulation effect when the seawater inside the evaporation tray evaporates to improve the evaporation effect.

(4) In the high-efficiency solar multi-layer evaporative seawater desalination device, a seawater artesian pipe is arranged between every two adjacent evaporation trays; when seawater is injected from the uppermost evaporation tray, after the uppermost evaporation tray is fully filled with seawater, the seawater will flow to the lower evaporation tray through the seawater artesian pipe; seawater can be injected regularly or continuously according to a specified flow rate; and excess seawater will flow out from the seawater overflow pipe on an outer wall of the lowermost evaporation tray to avoid excessive salt deposition.

(5) In the high-efficiency solar multi-layer evaporative seawater desalination device, an evaporation tray is fixedly arranged on a top of an inner wall of the wedge-shaped recess, and a modular production and arrangement method is adopted in the production of the device. According to actual needs, modules can be accumulated to extend a height and a length and a quantity of evaporation trays can be increased by stacking, which reduces the overall footprint of the device; and devices can be placed at a specified spacing, such as to facilitate the large-scale placement and use.

BRIEF DESCRIPTION OF THE DRAWINGS

In order to explain the embodiments of the present invention or the technical solutions in the prior art more clearly, the accompanying drawings that need to be used in the description of the embodiments or the prior art will be briefly introduced below. Obviously, the accompanying drawings in the following description are only exemplary. For those of ordinary skill in the art, other implementation drawings can be derived from the provided accompanying drawings without creative work.

The structure, scale, size, and the like shown in the drawings of this specification are only used to match the content provided in the specification and for those skilled in the art to understand and read, which are not used to limit the limitations for implementing the present invention and thus are not technically substantial. Any structural modification, scaling relation change, or size adjustment made without affecting the effects and objectives that can be achieved by the present invention shall fall within the scope that can be encompassed by the technical content provided in the present invention.

REFERENCE NUMERALS

1 represents a transparent housing; 2 represents a wedge-shaped recess; 3 represents an evaporation tray; 4 represents a thermal insulation layer; 5 represents a freshwater collection box; 6 represents a freshwater outlet pipe; 7 represents a first control valve; 8 represents a seawater inlet; 9 represents a seawater inlet pipe; 10 represents a second control valve; 11 represents a connecting port; 12 represents a seawater artesian pipe; 13 represents an overflow port; 14 represents a seawater overflow pipe; and 15 represents a third control valve.

DETAILED DESCRIPTION OF THE EMBODIMENTS

The technical solutions in the examples of the present invention are clearly and completely described below with reference to the accompanying drawings in the examples of the present invention. Apparently, the described examples are merely a part rather than all of the examples of the present invention. All other examples obtained by a person of ordinary skill in the art based on the examples of the present invention without creative efforts shall fall within the protection scope of the present invention.

Figure 1:
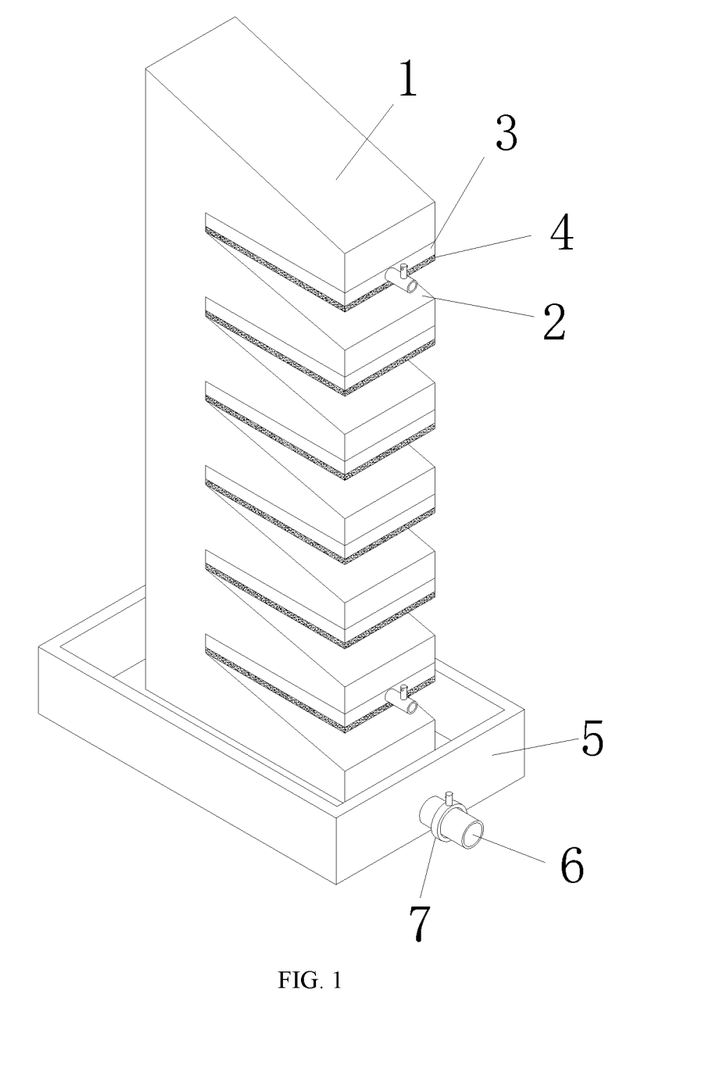
FIG. 1 is a schematic perspective view of the structure of the present invention.
Figure 2:
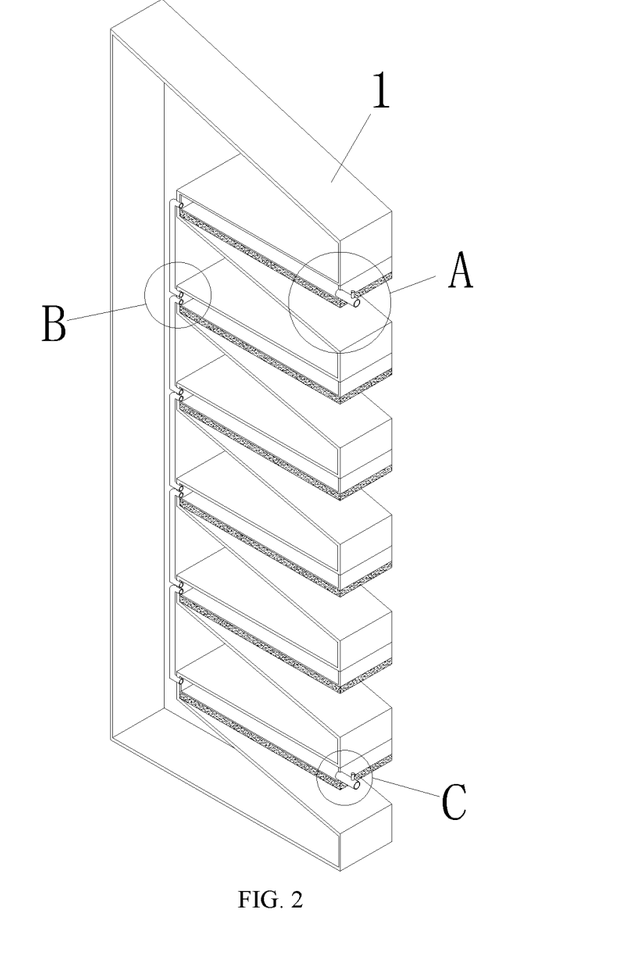
FIG. 2 is a schematic half-section perspective view of the transparent housing in the structure of the present invention.
Figure 3:
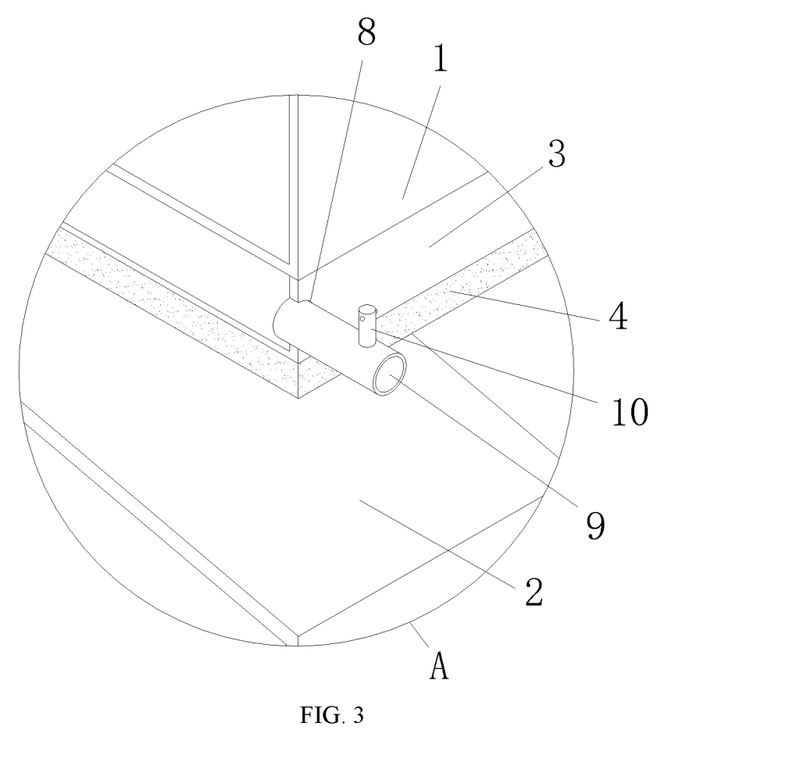
FIG. 3 is a schematic enlarged view of FIG. 2 at A.
Figure 4:
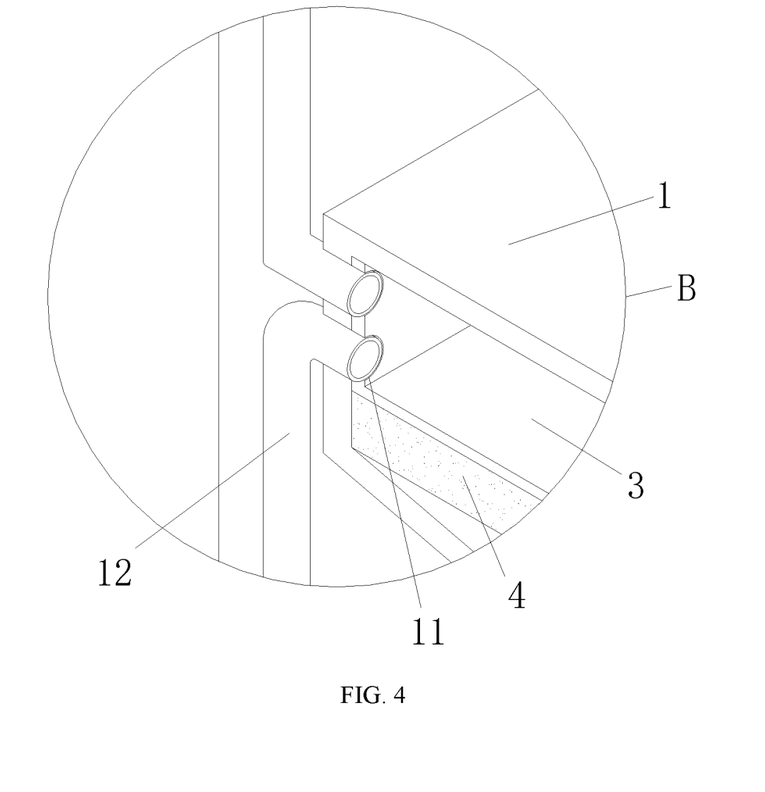
FIG. 4 is a schematic enlarged view of FIG. 2 at B.
Figure 5:
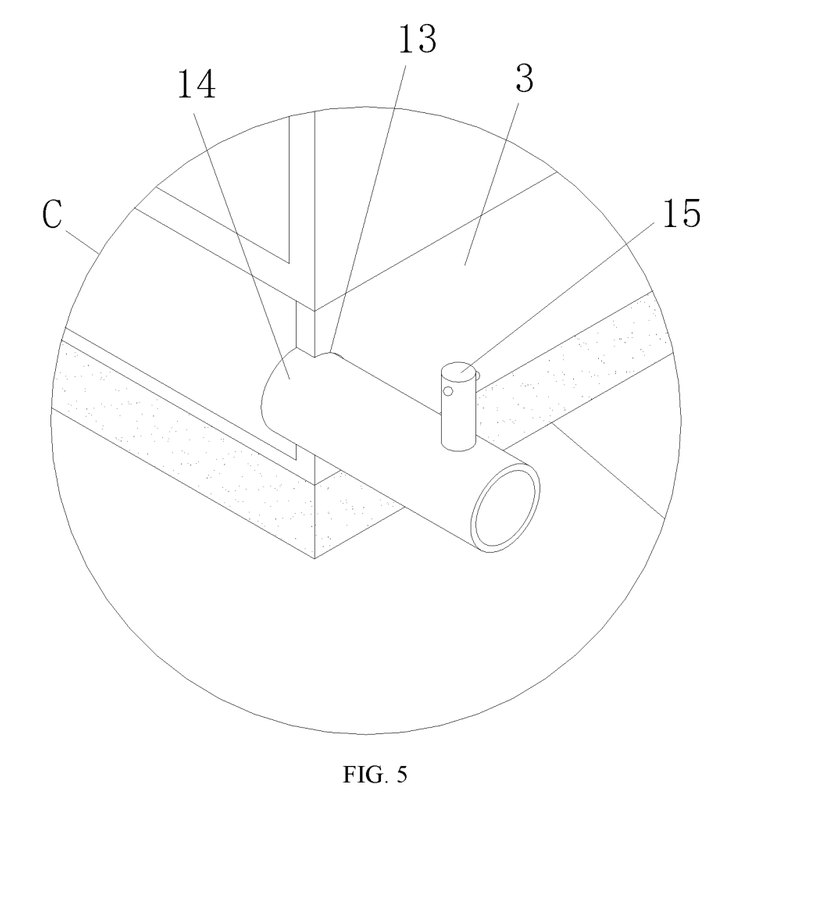
FIG. 5 is a schematic enlarged view of FIG. 2 at C.

Example: A high-efficiency solar multi-layer evaporative seawater desalination device is provided. As shown in FIG. 1 to FIG. 5, the device includes a transparent housing 1; the transparent housing 1 has a cross section in a right-angled trapezoid, has a hollow structure, and is made of a transparent plastic material; during seawater desalination, a left wall surface of the transparent housing 1 is a light-facing surface, and a right wall surface of the transparent housing 1 is a shady surface; the transparent housing 1 is made of a transparent plastic material, such that, during seawater desalination, sunlight can directly enter the transparent housing 1 and increase a temperature therein to speed up the evaporation; a bottom of the transparent housing 1 is provided with a freshwater collection box 5, the freshwater collection box 5 has a rectangular hollow structure, and a rectangular opening is formed on a top of the freshwater collection box 5; a bottom of the transparent housing 1 is in contact with a bottom of an inner wall of the freshwater collection box 5 and the transparent housing 1 is horizontally placed inside the freshwater collection box 5; the freshwater collection box 5 can be configured to collect freshwater recovered during desalination; a water outlet is formed on an outer wall of the freshwater collection box 5, and a freshwater outlet pipe 6 is inserted into the water outlet; the freshwater outlet pipe 6 is a cylindrical hollow pipe, and an outer wall of the freshwater outlet pipe 6 is provided with a first control valve 7; when the freshwater collection in the freshwater collection box 5 ends, the freshwater in the freshwater collection box 5 is controlled by the first control valve 7 to flow out through the freshwater outlet pipe 6 for people to use; wedge-shaped recesses 2 are formed on the outer wall of the transparent housing 1, and the wedge-shaped recesses 2 are wedge-shaped grooves; a quantity of wedge-shaped recesses 2 is determined according to a height of a right wall surface of the transparent housing 1 and the wedge-shaped recesses 2 are equally spaced on the right wall surface of the transparent housing 1; the wedge-shaped recesses 2 are on a shady surface, and during desalination, a lower part of the wedge-shaped recess 2 serves as a condensation surface, which increases a condensation area and an area in contact with air, reduces a surface temperature, and improves the condensation efficiency; a bottom of an inner wall of the wedge-shaped recess 2 is inclined downward to speed up the flow of water droplets; an evaporation tray 3 is fixedly arranged on a top of an inner wall of the wedge-shaped recess 2, the evaporation tray 3 has a rectangular hollow structure, and a rectangular opening is formed on a top of the evaporation tray 3; during seawater desalination, seawater is injected through a seawater inlet pipe 9 from the uppermost evaporation tray 3, and the seawater inside the evaporation tray 3 evaporates under direct sunlight, which increases the overall evaporation area; a bottom of the evaporation tray 3 is provided with a thermal insulation layer 4, the thermal insulation layer 4 has a rectangular structure and the thermal insulation layer 4 is made of a black heat-insulating heat-gathering foam material; during seawater desalination, the thermal insulation layer 4 can exert a thermal insulation effect to improve the seawater desalination effect; a seawater inlet 8 is formed on an outer wall of the uppermost evaporation tray 3, and the seawater inlet 8 is a circular through-hole; a seawater inlet pipe 9 is inserted into the seawater inlet 8, and the seawater inlet pipe 9 has a cylindrical hollow tubular structure; during seawater desalination, seawater is delivered into the uppermost evaporation tray 3 through the seawater inlet pipe 9; an outer wall of the seawater inlet pipe 9 is provided with a second control valve 10; a connecting port 11 is formed on an outer wall of the evaporation tray 3, and the connecting port 11 is a circular through-hole; a perforation is formed at a position on an inner wall of the wedge-shaped recess 2 that corresponds to the connecting port 11, and the perforation is a circular through-hole; a seawater artesian pipe 12 is arranged between every two adjacent evaporation trays 3, and the seawater artesian pipe 12 is a U-shaped hollow pipe; the seawater artesian pipe 12 is inserted into a corresponding connecting port 11, and the seawater artesian pipe 12 penetrates an inside of a corresponding perforation on the wedge-shaped recess 2 and is inserted into the perforation; an overflow port 13 is formed on an outer wall of the lowermost evaporation tray 3, and the overflow port 13 is a circular through-hole; a seawater overflow pipe 14 is inserted into the overflow port 13, and the seawater overflow pipe 14 is a cylindrical hollow pipe; when seawater is injected from the uppermost evaporation tray 3, after the uppermost evaporation tray 3 is fully filled with seawater, the seawater will flow to the lower evaporation tray 3 through the seawater artesian pipe 12; seawater can be injected regularly or continuously according to a specified flow rate; excess seawater will flow out from the seawater overflow pipe 14 on an outer wall of the lowermost evaporation tray 3 to avoid excessive salt deposition; and an outer wall of the seawater overflow pipe 14 is provided with a third control valve 15.

A working principle of the present invention: An evaporation tray 3 is fixedly arranged on a top of an inner wall of the wedge-shaped recess 2, and a modular production and arrangement method is adopted in the production of the device. According to actual needs, modules can be accumulated to extend a height and a length and a quantity of evaporation trays 3 can be increased by stacking, which reduces the overall footprint of the device; and devices can be placed at a specified spacing, such as to facilitate the large-scale placement and use.

Wedge-shaped recesses 2 are formed on an outer wall of the transparent housing 1; during seawater desalination, as the transparent housing 1 is made of a transparent plastic material, sunlight can directly enter the transparent housing 1 and increase a temperature therein to speed up the evaporation; the wedge-shaped recesses 2 on the outer wall of the transparent housing 1 are on a shady surface; during desalination, seawater in the evaporation trays 3 absorbs heat and evaporates to form water vapor, such that there is a given temperature difference between the water vapor and the outside; and a lower part of the wedge-shaped recess 2 can serve as a condensation surface, which increases a condensation area and an area in contact with air, reduces a surface temperature, and improves the condensation efficiency.

Multiple layers of evaporation trays 3 are arranged inside the transparent housing 1; during seawater desalination, seawater is injected through a seawater inlet pipe 9 from the uppermost evaporation tray 3; the evaporation trays 3 are fixedly connected to the transparent housing 1, and sunlight is irradiated on the evaporation trays 3 through the transparent housing 1; during desalination, the seawater in the evaporation trays 3 absorbs heat and evaporates to form water vapor; the arrangement of the multiple layers of evaporation trays 3 increases an evaporation area; a bottom of the evaporation tray 3 is an upper part of the wedge-shaped recess 2, and a thermal insulation layer 4 is arranged at the bottom of the evaporation tray 3; when the seawater in the evaporation tray 3 is to be subjected to evaporation, sunlight is irradiated on the evaporation tray 3 through the transparent housing 1; and, during desalination, the seawater in the evaporation tray 3 absorbs heat and evaporates to form water vapor, and the thermal insulation layer 4 can exert a thermal insulation effect when the seawater inside the evaporation tray 3 evaporates to improve the evaporation effect.

A seawater artesian pipe 12 is arranged between every two adjacent evaporation trays 3; when seawater is injected from the uppermost evaporation tray 3, after the uppermost evaporation tray 3 is fully filled with seawater, the seawater will flow to the lower evaporation tray 3 through the seawater artesian pipe 12; seawater can be injected regularly or continuously according to a specified flow rate; and excess seawater will flow out from the seawater overflow pipe 14 on an outer wall of the lowermost evaporation tray 3 to avoid excessive salt deposition.

Seawater is injected into the evaporation trays 3 through the seawater inlet pipe 9, the evaporation trays 3 are fixedly connected to the transparent housing 1, and sunlight is irradiated on the evaporation trays 3 through the transparent housing 1; the transparent housing 1 is made of a transparent plastic material, such that sunlight can directly enter the transparent housing 1 and increase a temperature therein to speed up the evaporation; the wedge-shaped recesses 2 on the outer wall of the transparent housing 1 are on a shady surface; during desalination, seawater in the evaporation trays 3 absorbs heat and evaporates to form water vapor, such that there is a given temperature difference between the water vapor and the outside; a lower part of the wedge-shaped recess 2 can serve as a condensation surface, the water vapor condenses on the transparent housing 1 or at the wedge-shaped recess 2, and the condensed water droplets flow along the outer wall of the transparent housing 1 to a freshwater collection box 5 at a bottom for collection; when freshwater needs to be used, the freshwater is controlled by the first control valve 7 to flow out from the freshwater outlet pipe 6 for people to use; and a bottom of an inner wall of the wedge-shaped recess 2 is inclined downward to speed up the flow of the water droplets.

Therefore, the detailed description of the embodiments of the present invention in the accompanying drawings is not intended to limit the protection scope of the present invention, but merely represent the selected embodiments of the present invention. On the basis of the embodiments of the present invention, all other embodiments obtained by a person of ordinary skill in the art without making creative efforts shall fall within the protection scope of the present invention.

It should be noted that similar reference signs and letters represent similar items in the accompanying drawings below. Therefore, once an item is defined in one accompanying drawing, it does not need to be further defined and described in subsequent accompanying drawings.

It should be understood that, in the description of the present invention, the terms such as "central", "longitudinal", "transverse", "long", "wide", "thick", "upper", "lower", "front", "back", "left", "right", "vertical", "horizontal", "top", "bottom", "inner", "outer", "clockwise", and "anticlockwise" are intended to indicate orientation or position relationships shown in accompanying drawings, and these terms are merely intended to facilitate the description of the present invention or simplify the description, rather than to indicate or imply that the mentioned apparatus or elements must have the specific orientation or be constructed and operated in the specific orientation. Therefore, these terms may not be construed as a limitation to the present invention.

Moreover, the terms such as "first" and "second" are used only for the purpose of description and cannot be understood as indicating or implying relative importance or implicitly indicating a quantity of technical features denoted. Thus, features defined with "first" and "second" may explicitly or implicitly include one or more of the features. In the description of the present invention, "a plurality of" means two or more, unless otherwise specifically defined.

In the present invention, unless otherwise specified and defined, the terms such as "connected to", "connected with", and "fixed" should be comprehended in a broad sense. For example, these terms may be comprehended as being fixedly connected, removably connected, or integrally connected; may be comprehended as being directly connected, or indirectly connected through an intermediate medium; and may be comprehended as being in an internal communication between two elements or an interactive relationship between two elements. Those of ordinary skill in the art may understand specific meanings of the above terms in the present invention based on a specific situation.

In the present invention, unless otherwise expressly specified and defined, that a first feature is "above" or "below" a second feature may include that the first feature is in direct contact with the second feature, or that the first feature and the second feature are not in direct contact with each other but are in contact by using another feature therebetween. In addition, that the first feature is "over", "above", and "on" the second feature includes that the first feature is directly above and diagonally above the second feature, or simply indicates that a horizontal height of the first feature is larger than that of the second feature. That the first feature is "beneath", "below", and "under" the second feature includes that the first feature is directly below and diagonally below the second feature, or simply indicates that a horizontal height of the first feature is smaller than that of the second feature.

The above shows and describes the basic principles, main features, and advantages of the present invention. It should be understood by those skilled in the art that, the present invention is not limited by the above examples, and the above examples and the description only illustrate the principle of the present invention. Various changes and modifications may be made to the present invention without departing from the spirit and scope of the present invention, and such changes and modifications all fall within the claimed scope of the present invention. The protection scope of the present invention is defined by the appended claims and equivalents thereof.

What is claimed is:

1. A high-efficiency solar multi-layer evaporative seawater desalination device, comprising:
   a transparent housing, wherein a freshwater collection box is provided at a bottom of the transparent housing;
   wedge-shaped recesses are formed on an outer wall of the transparent housing, and the wedge-shaped recesses are wedge-shaped grooves;
   an evaporation tray is fixedly arranged on a top of an inner wall of each of the wedge-shaped recesses;
   a seawater inlet is formed on an outer wall of the evaporation tray located at an uppermost side; and
   a seawater inlet pipe is inserted into the seawater inlet.

2. The high-efficiency solar multi-layer evaporative seawater desalination device according to claim 1, wherein a quantity of the wedge-shaped recesses is determined according to a height of a right wall surface of the transparent housing and the wedge-shaped recesses are equally spaced on the right wall surface of the transparent housing.

3. The high-efficiency solar multi-layer evaporative seawater desalination device according to claim 1, wherein the bottom of the transparent housing is in contact with a bottom of an inner wall of the freshwater collection box and the transparent housing is horizontally placed inside the freshwater collection box.

4. The high-efficiency solar multi-layer evaporative seawater desalination device according to claim 1, wherein a water outlet is formed on an outer wall of the freshwater collection box, a freshwater outlet pipe is inserted into the water outlet, and an outer wall of the freshwater outlet pipe is provided with a first control valve.

5. The high-efficiency solar multi-layer evaporative seawater desalination device according to claim 1, wherein the transparent housing has a cross section in a right-angled trapezoid and the transparent housing is made of a transparent plastic material, a left wall surface of the transparent housing is a light-facing surface, and a right wall surface of the transparent housing is a shady surface.

6. The high-efficiency solar multi-layer evaporative seawater desalination device according to claim 1, wherein a bottom of the evaporation tray is provided with a thermal insulation layer and the thermal insulation layer is made of a black heat-insulating heat-gathering foam material.

7. The high-efficiency solar multi-layer evaporative seawater desalination device according to claim 1, wherein an outer wall of the seawater inlet pipe is provided with a second control valve.

8. The high-efficiency solar multi-layer evaporative seawater desalination device according to claim 1, wherein a connecting port is formed on the outer wall of the evaporation tray, a perforation is formed at a position on the inner wall of each of the wedge-shaped recesses corresponding to the connecting port, and a seawater artesian pipe is arranged between every two adjacent evaporation trays.

9. The high-efficiency solar multi-layer evaporative seawater desalination device according to claim 8, wherein the seawater artesian pipe is a U-shaped hollow pipe; the seawater artesian pipe is inserted into the connecting port corresponding to the seawater artesian pipe; and the seawater artesian pipe penetrates an inside of the perforation corresponding to the seawater artesian pipe on each of the wedge-shaped recesses and the seawater artesian pipe is inserted into the perforation.

10. The high-efficiency solar multi-layer evaporative seawater desalination device according to claim 1, wherein an overflow port is formed on an outer wall of the evaporation tray located at a lowermost side, a seawater overflow pipe is inserted into the overflow port, and an outer wall of the seawater overflow pipe is provided with a third control valve.

\* \* \* \* \*